United States Patent
Chen et al.

(10) Patent No.: US 10,974,460 B2
(45) Date of Patent: Apr. 13, 2021

(54) RECONSTRUCTION OF SURFACES FOR ADDITIVE MANUFACTURING

(71) Applicant: Inkbit, LLC, Medford, MA (US)

(72) Inventors: Desai Chen, Arlington, MA (US); Wojciech Matusik, Lexington, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 16/737,310

(22) Filed: Jan. 8, 2020

(65) Prior Publication Data

US 2020/0215761 A1 Jul. 9, 2020

Related U.S. Application Data

(60) Provisional application No. 62/789,780, filed on Jan. 8, 2019.

(51) Int. Cl.
  *G05B 19/40* (2006.01)
  *B33Y 50/02* (2015.01)
  (Continued)

(52) U.S. Cl.
  CPC .......... *B29C 64/393* (2017.08); *B29C 64/112* (2017.08); *B33Y 50/02* (2014.12);
  (Continued)

(58) Field of Classification Search
  None
  See application file for complete search history.

(56) References Cited

U.S. PATENT DOCUMENTS

| | | |
|---|---|---|
| 5,460,758 A | 10/1995 | Langer et al. |
| 6,492,651 B2 | 12/2002 | Kerekes |

(Continued)

FOREIGN PATENT DOCUMENTS

| | | |
|---|---|---|
| EP | 3459716 A1 | 3/2019 |
| JP | 2014098555 A | 5/2014 |

(Continued)

OTHER PUBLICATIONS

Qi, X.; Chen, G.; Li, Y; Cheng, X.; and Li, C., "Applying Neural-Network-Based Machine Learning to Additive Manufacturing: Current Applications, Challenges, and Future Perspectives", Jul. 29, 2018, Engineering 5 (2019) 721-729. (Year: 2019).*

(Continued)

*Primary Examiner* — Mohammad Ali
*Assistant Examiner* — Kelvin Booker
(74) *Attorney, Agent, or Firm* — Occhiuti & Rohlicek LLP

(57) ABSTRACT

Tracking of measured depth with intervening depositing of one or more layers provides a way of improving the accuracy of surface reconstruction. For example, knowledge of the desired or expected thickness of each layer, in combination with the scan data is combined to yield higher accuracy than is available from scan data of a single scan alone. One application of such an accurate surface reconstruction is in a feedback arrangement in which the desired thickness of one or more subsequent layers to be deposited after scanning is determined from the estimate of the surface depth and a model of the object that is being fabricated, and by increasing accuracy of the surface depth estimate, the precision of the fabrication of the object may be increased.

17 Claims, 6 Drawing Sheets

(51) Int. Cl.
*B29C 64/393* (2017.01)
*B29C 64/112* (2017.01)
*G05B 19/4099* (2006.01)

(52) U.S. Cl.
CPC .............. *G05B 19/4099* (2013.01); *G05B 2219/35134* (2013.01); *G05B 2219/49023* (2013.01)

(56) References Cited

U.S. PATENT DOCUMENTS

| | | | |
|---|---|---|---|
| 9,562,759 B2 | 2/2017 | Vogler et al. | |
| 9,952,506 B2 | 4/2018 | Arai et al. | |
| 10,011,071 B2 | 7/2018 | Batchelder | |
| 10,252,466 B2* | 4/2019 | Ramos | B33Y 30/00 |
| 10,456,984 B2 | 10/2019 | Matusik et al. | |
| 2002/0104973 A1 | 8/2002 | Kerekes | |
| 2004/0173946 A1 | 9/2004 | Pfeifer et al. | |
| 2007/0106172 A1 | 5/2007 | Abreu | |
| 2007/0241482 A1 | 10/2007 | Giller et al. | |
| 2008/0124475 A1 | 5/2008 | Kritchman | |
| 2009/0073407 A1 | 3/2009 | Okita | |
| 2009/0105605 A1 | 4/2009 | Abreu | |
| 2009/0220895 A1 | 9/2009 | Garza et al. | |
| 2009/0279089 A1 | 11/2009 | Wang | |
| 2009/0279098 A1 | 11/2009 | Ohbayashi et al. | |
| 2010/0140550 A1 | 6/2010 | Keller et al. | |
| 2010/0158332 A1 | 6/2010 | Rico et al. | |
| 2012/0275148 A1 | 11/2012 | Yeh et al. | |
| 2013/0182260 A1 | 7/2013 | Bonnema et al. | |
| 2014/0249663 A1 | 9/2014 | Voillaume | |
| 2014/0300676 A1 | 10/2014 | Miller et al. | |
| 2015/0061178 A1 | 3/2015 | Siniscalchi et al. | |
| 2015/0101134 A1 | 4/2015 | Manz et al. | |
| 2015/0352792 A1 | 12/2015 | Kanada | |
| 2016/0018404 A1 | 1/2016 | Iyer et al. | |
| 2016/0023403 A1* | 1/2016 | Ramos | B29C 64/393 264/40.1 |
| 2016/0157751 A1* | 6/2016 | Mahfouz | A61B 5/062 600/409 |
| 2016/0167301 A1 | 6/2016 | Cole et al. | |
| 2016/0209319 A1* | 7/2016 | Adalsteinsson | G06K 9/4652 |
| 2016/0249836 A1 | 9/2016 | Gulati et al. | |
| 2016/0320771 A1 | 11/2016 | Huang | |
| 2016/0347005 A1 | 12/2016 | Miller | |
| 2017/0021455 A1 | 1/2017 | Dallarosa et al. | |
| 2017/0087766 A1* | 3/2017 | Chung | B33Y 70/00 |
| 2017/0106604 A1 | 4/2017 | Dikovsky et al. | |
| 2017/0120337 A1 | 5/2017 | Kanko et al. | |
| 2017/0143494 A1* | 5/2017 | Mahfouz | A61B 34/20 |
| 2017/0217103 A1 | 8/2017 | Babaei et al. | |
| 2017/0235293 A1* | 8/2017 | Shapiro | G05B 19/406 700/166 |
| 2017/0355147 A1 | 12/2017 | Buller et al. | |
| 2018/0017501 A1 | 1/2018 | Trenholm et al. | |
| 2018/0036964 A1* | 2/2018 | DehghanNiri | G01N 27/9013 |
| 2018/0056582 A1 | 3/2018 | Matusik et al. | |
| 2018/0071984 A1 | 3/2018 | Lee et al. | |
| 2018/0099333 A1* | 4/2018 | DehghanNiri | B22F 3/1055 |
| 2018/0143147 A1 | 5/2018 | Milner et al. | |
| 2018/0154580 A1* | 6/2018 | Mark | B29C 64/35 |
| 2018/0169953 A1 | 6/2018 | Matusik et al. | |
| 2018/0194066 A1* | 7/2018 | Ramos | B33Y 50/02 |
| 2018/0273657 A1 | 9/2018 | Wang et al. | |
| 2018/0281067 A1 | 10/2018 | Small et al. | |
| 2018/0297113 A1 | 10/2018 | Preston et al. | |
| 2018/0304549 A1 | 10/2018 | Safai et al. | |
| 2018/0311893 A1* | 11/2018 | Choi | B29C 64/264 |
| 2018/0320006 A1* | 11/2018 | Lee | B33Y 70/00 |
| 2018/0341248 A1* | 11/2018 | Mehr | B33Y 50/02 |
| 2018/0348492 A1 | 12/2018 | Pavlov et al. | |
| 2019/0077921 A1 | 3/2019 | Eckel | |
| 2019/0118300 A1* | 4/2019 | Penny | B33Y 50/02 |
| 2019/0270254 A1* | 9/2019 | Mark | B29C 64/141 |
| 2019/0271966 A1 | 9/2019 | Coffman et al. | |
| 2019/0322031 A1 | 10/2019 | Kritchman | |
| 2019/0329322 A1 | 10/2019 | Preston et al. | |
| 2019/0346830 A1 | 11/2019 | de Souza Borges Ferreira et al. | |
| 2019/0353767 A1* | 11/2019 | Eberspach | G01S 7/4808 |
| 2020/0004225 A1* | 1/2020 | Buller | B29C 64/393 |
| 2020/0122388 A1* | 4/2020 | Van Esbroeck | B08B 3/10 |
| 2020/0143006 A1 | 5/2020 | Matusik et al. | |
| 2020/0147888 A1* | 5/2020 | Ramos | B29C 64/386 |
| 2020/0215761 A1 | 7/2020 | Chen et al. | |

FOREIGN PATENT DOCUMENTS

| | | |
|---|---|---|
| JP | 6220476 B1 | 10/2017 |
| JP | 2018103488 A | 7/2018 |
| KR | 101567281 B1 | 11/2015 |
| KR | 20180067961 A | 6/2018 |
| WO | 2003/026876 A2 | 4/2003 |
| WO | 2017066077 A1 | 4/2017 |
| WO | 2018080397 A1 | 5/2018 |
| WO | 2018197376 A1 | 11/2018 |
| WO | 2018209438 A1 | 11/2018 |
| WO | 2019070644 A2 | 4/2019 |
| WO | 2019125970 A1 | 6/2019 |
| WO | 2020123479 A1 | 6/2020 |

OTHER PUBLICATIONS

DebRoy, T.; Wei, H.L.; Zuback, J.S.; Mukherjee, T.; Elmer, J.W.; Milewski, J.O.; Beese, A.M.; Wilson-Heid, A.; Ded, A.; and Zhang, W., "Additive manufacturing of metallic components—Process, structure and properties", Jul. 3, 2017, Progress in Materials Science 92 (2018) 112-224. (Year: 2017).*

International Search Report dated May 6, 2020 in PCT Application No. PCT/US2020/012714.

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.

Alarousu, Erkki, Ahmed AlSaggaf, and Ghassan E. Jabbour. "Online monitoring of printed electronics by spectral-domain optical coherence tomography." Scientific reports 3 (2013): 1562.

Daniel Markl et al: "Automated pharmaceutical tablet coating layer evaluation of optical coherence tomography images", Measurement Science and Technology, IOP, Bristol, GB, vol. 26, No. 3, Feb. 2, 2015 (Feb. 2, 2015), p. 35701, XP020281675, ISSN: 0957-0233, DOI: 10.1088/0957-0233/26/3/035701 [retrieved on Feb. 2, 2015].

Daniel Markl et al: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL ISSN: 0143-8166, DOI: 10.1016/j.optlaseng.2014.02.008.

Fischer, Björn, Christian Wolf, and Thomas Härtling. "Large field optical tomography system." In Smart Sensor Phenomena, Technology, Networks, and Systems Integration 2013, vol. 8693, p. 86930P. International Society for Optics and Photonics, 2013.

Huo, Tiancheng, Chengming Wang, Xiao Zhang, Tianyuan Chen, Wenchao Liao, Wenxin Zhang, Shengnan Ai, Jui-Cheng Hsieh, and Ping Xue. "Ultrahigh-speed optical coherence tomography utilizing all-optical 40 MHz swept-source." Journal of biomedical optics 20, No. 3 (2015): 030503.

Klein, Thomas, and Robert Huber. "High-speed OCT light sources and systems." Biomedical optics express 8, No. 2 (2017): 828-859.

Moon, Sucbei, and Dug Young Kim. "Ultra-high-speed optical coherence tomography with a stretched pulse supercontinuum source." Optics Express 14, No. 24 (2006): 11575-11584.

Park, Yongwoo, Tae-Jung Ahn, Jean-Claude Kieffer, and José Azaña. "Optical frequency domain reflectometry based on real-time Fourier transformation." Optics express 15, No. 8 (2007): 4597-4616.

Wieser, Wolfgang, Benjamin R. Biedermann, Thomas Klein, Christoph M. Eigenwillig, and Robert Huber. "Multi-megahertz OCT: High quality 3D imaging at 20 million A-scans and 4.5 GVoxels per second." Optics express 18, No. 14 (2010): 14685-14704.

(56) References Cited

OTHER PUBLICATIONS

Xu, Jingjiang, Xiaoming Wei, Luoqin Yu, Chi Zhang, Jianbing Xu, K. K. Y. Wong, and Kevin K. Tsia. "Performance of megahertz amplified optical time-stretch optical coherence tomography (AOT-OCT)." Optics express 22, No. 19 (2014): 22498-22512.

Zhou, Chao, Aneesh Alex, Janarthanan Rasakanthan, and Yutao Ma. "Space-division multiplexing optical coherence tomography." Optics express 21, No. 16 (2013): 19219-19227.

Blanken, Lennart, Robin de Rozario, Jurgen van Zundert, Sjirk Koekebakker, Maarten Steinbuch, and Tom Oomen. "Advanced feedforward and learning control for mechatronic systems." In Proc. 3rd DSPE Conf. Prec. Mech, pp. 79-86. 2016.

Blanken Lennart. "Learning and repetitive control for complex systems: with application to large format printers." (2019).

Oomen, Tom. "Advanced motion control for next-generation precision mechatronics: Challenges for control, identification, and learning." In IEEJ International Workshop on Sensing, Actuation, Motion Control, and Optimization (SAMCON), pp. 1-12. 2017.

Kulik, Eduard A., and Patrick Calahan. "Laser profilometry of polymeric materials." Cells and Materials 7, No. 2 (1997): 3.

\* cited by examiner

Filtered scan data sequence.

RECONSTRUCTION OF SURFACES FOR ADDITIVE MANUFACTURING

CROSS-REFERENCES TO RELATED APPLICATIONS

This application claims the benefit of U.S. Provisional Application No. 62/789,780 filed Jan. 8, 2019, which is incorporated herein by reference.

BACKGROUND OF THE INVENTION

This invention relates to reconstruction of surfaces during additive manufacturing.

Additive manufacturing is a set of methods that allows objects to be fabricated via selective addition of material. A typical additive manufacturing process works by slicing a digital model (for example, represented using an STL file) into a series of layers. Then the layers are sent to a fabrication apparatus that deposits the layers one by one from the bottom to the top. Additive manufacturing is rapidly gaining popularity in a variety of markets including automotive, aerospace, medical devices, pharmaceuticals, and industrial tooling.

Inkjet 3D printing is a method of additive manufacturing where printheads deposit droplets of printable material, also called ink. Printheads are typically mounted on a gantry system to allow deposition of printable liquid matrix material in different locations of the build volume. A build platform may also move with respect to the printheads, which may be stationary. The printable liquid matrix material is solidified using UV or visible-light radiation.

Multiple printheads may be used in one system in order to build objects with multiple base materials. For example, materials that have different optical, mechanical, thermal, electromagnetic properties can be used. These materials can be combined to achieve composite materials with a wide range of material properties.

Surface reconstruction is important for various machine vision applications. In some examples, to reconstruct a surface, a sensor system is used to measure the depth of the surface (e.g., the distance between a sensor over the object and the surface of the object). Given a known distance from the platform on which the object is being fabricated, a thickness of the object can be determined based on the depth of the surface. However, surface reconstruction based on depth measurements is potentially unreliable. For example, the sensor may receive data that is ambiguous or has high measurement error (e.g., there might be two or more possible values for the depth that are consistent with a measurement or the signal at the correct depth value might be weak resulting in the high measurement error).

SUMMARY OF THE INVENTION

In one aspect, in general, tracking of measured depth with intervening depositing of one or more layers provides a way of improving the accuracy of surface reconstruction. For example, knowledge of the desired or expected thickness of each layer in combination with the scan data is combined to yield higher accuracy than is available from scan data of a single scan alone. One application of such an accurate surface reconstruction is in a feedback arrangement in which the desired thickness of one or more subsequent layers to be deposited after scanning is determined from the estimate of the surface depth and a model of the object that is being fabricated. By increasing an accuracy of the surface depth estimate, a precision of the fabrication of the object may be increased.

In one aspect, in general, a method for determining estimated depth data for an object during additive fabrication comprises scanning the object producing scan data corresponding to a region of the object. This scanning includes successively scanning the object to produce successive scan data, with intervening additive fabrication of a material layer on the region of the object occurring between at least some successive scans of the object. Estimated depth data representing a surface of the object is determined after the successive scanning by combining the successive scan data.

Aspects can include one or more of the following features:

Combining the successive scan data includes determining estimated successive depth data from respective scan data and applying at least one of a regression and a probability based procedure to estimated successive depth data to yield the estimated depth data after the scanning. In some examples, expected depth change data associated with the intervening additive fabrication is determined, determining estimated depth data after the successive scanning includes combining the successive scan data and the expected depth change data. In some examples, determining the expected depth change data includes determining an average material layer thickness associated with each intervening additive fabrication.

The method further includes determining a statistical representation of depth change associated with the intervening additive fabrication, and wherein determining estimated depth data after the successive scanning includes combining the successive scan data and the statistical representation of depth change to yield a depth estimate.

Determining estimated depth data representing the surface of the object after the successive scanning by combining the successive scan data further uses a prior model of the object.

Scanning the object producing scan data includes spatially smoothing scan data across the region of the object.

Aspects may have one or more of the following advantages.

Aspects described herein advantageously use a temporal coherence that exists between consecutive scans during a printing process to determine an improved surface reconstruction over time of an object being fabricated. This temporal information may be combined with an expected surface of the object according to a (partial) digital model to further improve the surface reconstruction for each 3D scan.

Other features and advantages of the invention are apparent from the following description, and from the claims.

DETAILED DESCRIPTION

1 General System Overview

Figure 1:
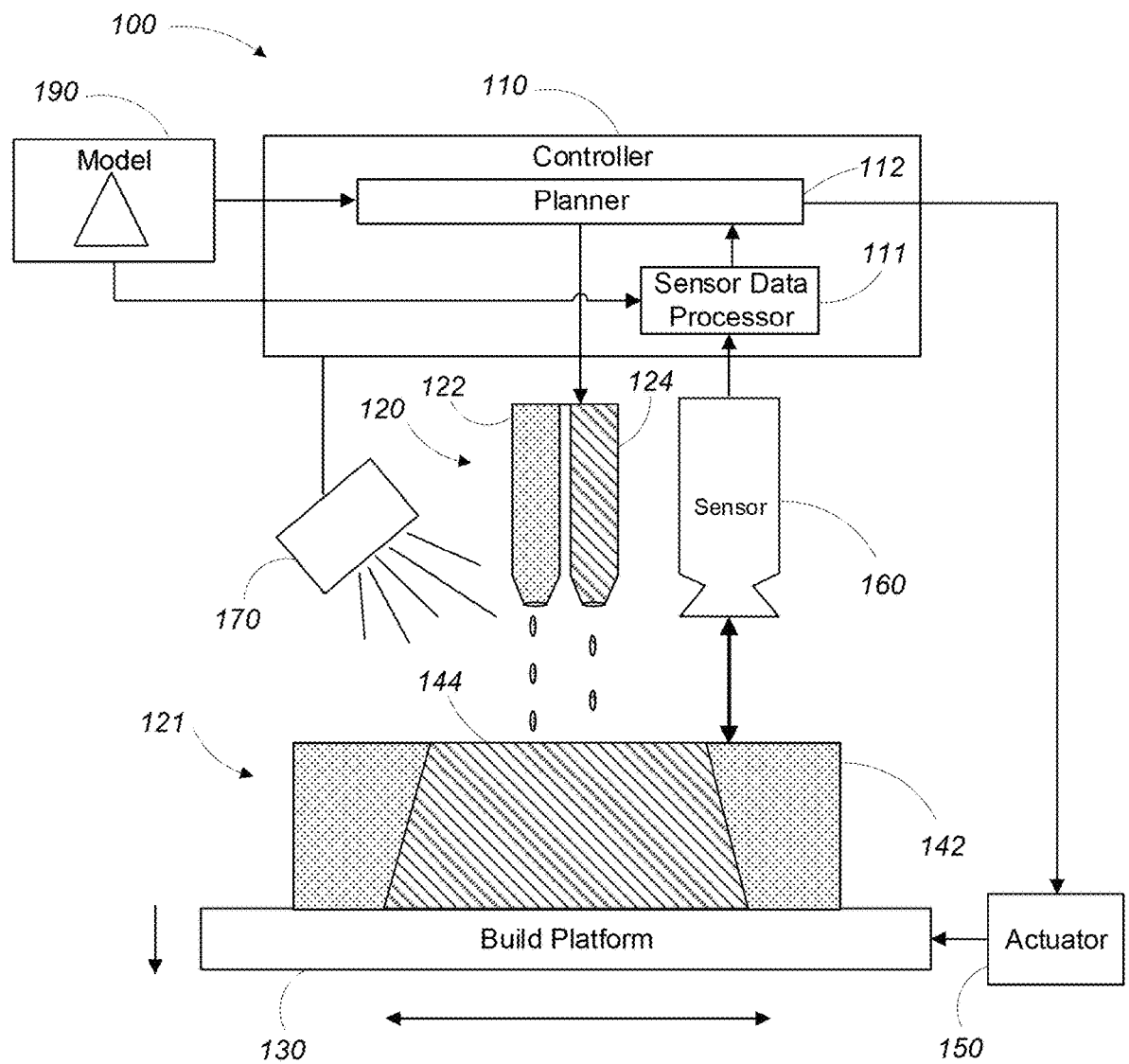
FIG. 1 is an exemplary additive fabrication system.

The description below relates to additive fabrication, for example, using a jetting-based 3D printer 100 as shown in FIG. 1. The printer 100 uses jets 120 (inkjets) to emit material for deposition of layers on a partially fabricated object 121. In the printer illustrated in FIG. 1, the object is fabricated on a build platform 130, which is controlled to move related to the jets (i.e., along an x-y plane) in a raster-like pattern to form successive layers, and in this example also to move relative to the jets (i.e., along a z-axis) to maintain a desired separation of the jets and the surface of the partially-fabricated object 121. As illustrated, there are multiple jets 122, 124, with one jet 122 being used to emit a support material to form a support structure 142 of the object, and another jet 124 being used to emit built material to form the object 144 itself. For materials for which curing is triggered by an excitation signal, such as an ultraviolet illumination, a curing signal generator 170 (e.g., a UV lamp) triggers curing of the material shortly after it is jetted onto the object. In other embodiments, multiple different materials may be used, for example, with a separate jet being used for each material. Yet other implementations do not necessarily use an excitation signal (e.g., optical, RF, etc.) and rather the curing is triggered chemically, for example, by mixing multiple components before jetting, or jetting separate components that mix and trigger curing on the object. Note that in some examples, after the additive deposition is complete, the object may be subject to further curing (e.g., to complete the curing), for example, by further exposing the object to UV radiation.

A sensor 160 (sometimes referred to as a scanner) is positioned above the object under fabrication 121 and is used to determine physical characteristics of the partially fabricated object. For example, the sensor 160 measures one or more of the surface geometry (e.g., a depth map characterizing the thickness/depth of the partially fabricated object) and subsurface characteristics (e.g., in the near surface comprising, for example, 10s or 100s of deposited layers). The characteristics that may be sensed can include one or more of a material density, material identification, and a curing state. Very generally, the measurements from the sensor 160 are associated with a three-dimensional (i.e., x, y, z) coordinate system where the x and y axes are treated as spatial axes in the plane of the build surface and the z axis is a height axis (i.e., growing as the object is fabricated).

In some examples, in the context of a digital feedback loop for additive manufacturing, the additive manufacturing system builds the object by printing layers. The sensor 160 captures the 3D scan information after the system 100 prints one or more layers. For example, the sensor 160 scans the partial object (or empty build platform), then the printer prints a layer (or layers) of material. Then, the sensor 160 scans the (partially built) object again. The new depth sensed by the sensor 160 should be at a distance that is approximately the old depth minus the thickness of layer (this assumes that the sensor 160 is positioned on the top of the of the object being built and the object is being built from the bottom layer to the top layer and the distance between the sensor 160 and the build platform is unchanged).

While various types of sensing can be used, examples described herein relate to the use of optical coherence tomography (OCT) to determine depth and volumetric information related to the object being fabricated. Very generally, optical coherence tomography (OCT) outputs a response as a function of depth generally corresponding to the amount of coherent reflection at that depth. At depths above the object, there should be no response, with response beginning that the depth corresponding to the surface height. Response continues into the body of the object with subsurface reflection, and ultimately within a short distance from the surface, response again diminishes, for example, due to attenuation of the signal in the body of the object. As a result, the raw OCT signal does not directly provide a surface depth estimate, which must be inferred from the shape of the response as a function of depth, with the surface height corresponding to the depth at the onset of a response. In a number of illustrations referenced below, the OCT response as a function of z is represented in gray-scale, with black representing no response and white representing a high level of response. It is noted that, in some examples, the raw OCT data includes ambiguities (e.g., the surface of the object may not be associated with the strongest or largest signal component of the raw OCT data). In such cases, a temporal progression of the raw OCT data is used to disambiguate the raw OCT data (as is described in greater detail below).

The controller 110 uses a model 190 of the object to be fabricated to control motion of the build platform 130 using a motion actuator 150 (e.g., providing three degrees of motion) and control the emission of material from the jets 120 according to non-contact feedback of the object characteristics determined via the sensor 160.

The controller 110 includes a sensor data processor 111 that implements a depth reconstruction procedure (described in greater detail below). The sensor data processor 111 receives the model 190 as well as scan data from the sensor 160 as input. As described below, the sensor data processor 111 processes the model 190 and a time history of scan data (referred to as 'successive scan data') from the sensor 160 to determine a high-quality depth reconstruction of the 3D object being fabricated. The depth reconstruction is provided to a planner 112, which modifies a fabrication plan for the 3D object based on the depth reconstruction.

2 Depth Reconstruction Module

Figure 2:
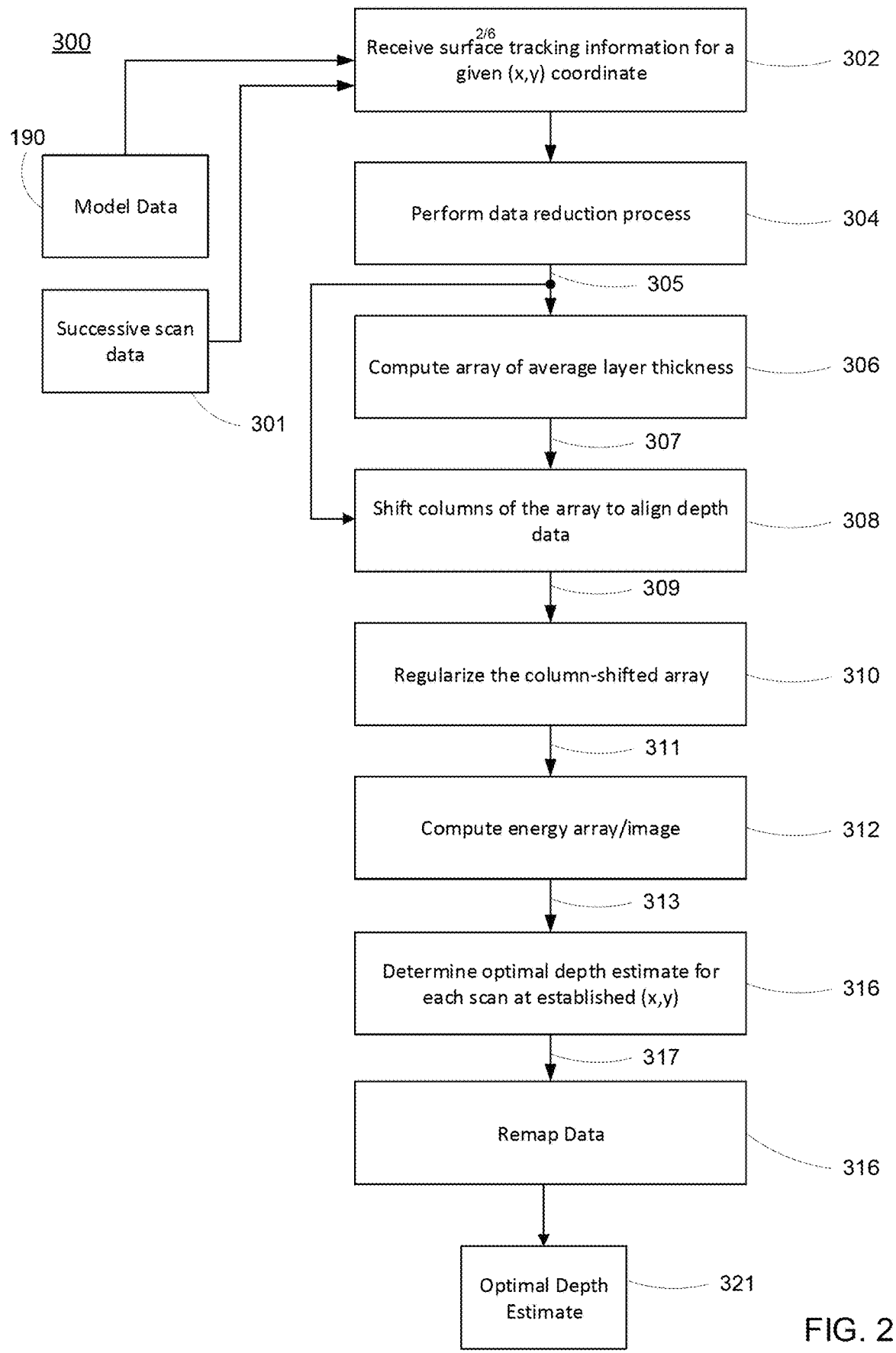
FIG. 2 is a flowchart of a depth reconstruction procedure.

Referring to FIG. 2, the depth reconstruction module 111 processes the model 190 of the part being fabricated and the successive scan data 301 in a depth reconstruction procedure 300 to determine, for a particular (x, y) coordinate on a 3D object being manufactured, an optimal depth estimate for each scan performed during the additive manufacturing process.

The description below relates to the depth reconstruction procedure 300 as it applies to reconstructing the depth for a single (x, y) position over time (or scans). However, it is noted that the depth reconstruction procedure 300 can be extended to reconstruct the depth for multiple or all (x, y) positions associated with the printing system.

2.1 Input to Depth Reconstruction Procedure

In a first step 302 of the depth reconstruction procedure 300, the model 190 and the successive scan data 301 are received.

Figure 3:
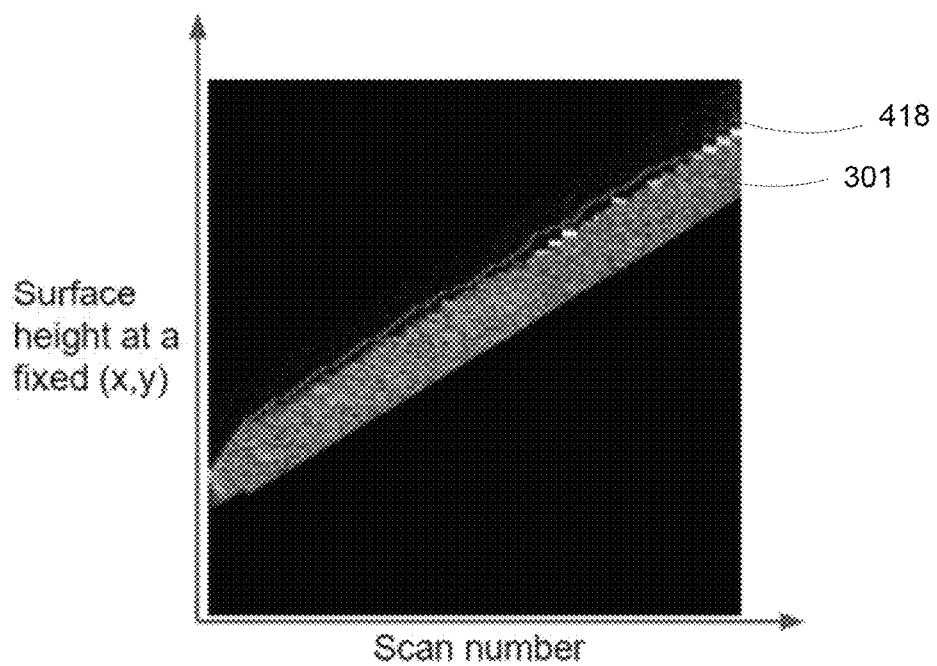
FIG. 3 is successive scan data at a particular (x, y) coordinate.

The successive scan data 301 includes a 3D scan for successive layers or subsequences of multiple layers deposited during fabrication of the 3D object. Referring to FIG. 3, in a graphical representation of the successive scan data 301, successive scans of an object after successive deposits of equal-thickness layers are arranged from left to right for a particular (x, y) location in the object. In some examples, the successive scan data 301 is organized as a 2D array where a value representing a black color in the figure corresponds to no OCT response, and a value representing a white color in the figure corresponds to a high OCT response. Because the volume of the object is getting larger and that the height of the top surface is increasing as the printer prints more material, the surface height increases as layers are deposited and the scans show a corresponding increase in surface height.

The model 190 is used by the depth reconstruction procedure 300 to derive an expected surface height for each layer of the partially fabricated object 121. In FIG. 3, the expected surface height is represented as a line 418. The expected surface height is useful for comparison to the actual printed surface height. For example, when fabricating the object 121, discrepancies between the model 190 and the actual material deposited often occur. Even if the jets are controlled to deposit a planned thickness, the achieved thickness of the layer may deviate from the plan due to variable or unpredicted characteristics of the jetting and/or due to changes after jetting such as during curing or flowing on the surface before curing. Furthermore, there may be misalignment between the object and its 3D model, for example, because the control of the jetting is offset in the x or y directions causing material to be deposited in locations offset from where planned. The expected height 418 derived from the model 190 can act as a constraint on the depth reconstruction procedure 300 in that it can be used to resolve ambiguities in the 3D scanning process. For the sensor 160 (e.g., an OCT sensor or laser Profilometer) can provide multiple peaks in a frequency domain representation of an intensity signal, and each peak can be blurry. Using estimate from previous layer, plus the knowledge of whether the printer jetted for the next layer or not, an estimate of where expected next depth measurement can be obtained. Then, a bias towards the peak near the expected height is set (i.e. a dimmer peak near the expected depth is preferred over a bright peak far away from expected depth).

More generally, the scanning process can be unreliable due to sensor noise, indirect light reflections, signal attenuation due to surface geometry, occlusion, and so on. Furthermore, it is possible that the strongest signal in the raw OCT data is not necessarily associated with the actual top/surface of the object being scanned. Temporal data (e.g., previous scans) and/or printed model data can help to disambiguate these cases. This is because it is known that the depth is changing in almost continuous/discrete steps as the object is fabricated. In some examples, temporal data from spatial neighborhood can also be used. This is because it is known that the printed surfaces are typically continuous/ smooth (there are typically few discontinuities).

2.2 Data Reduction

Referring again to FIG. 2, the successive scan data 301 and the model 190 received by the first step 302 are provided as input to a second step 304. The second step 304 processes the successive scan data 301 and the model 190 in a data reduction process to generate a reduced data representation 305 of the successive scan data 301.

Figure 4:
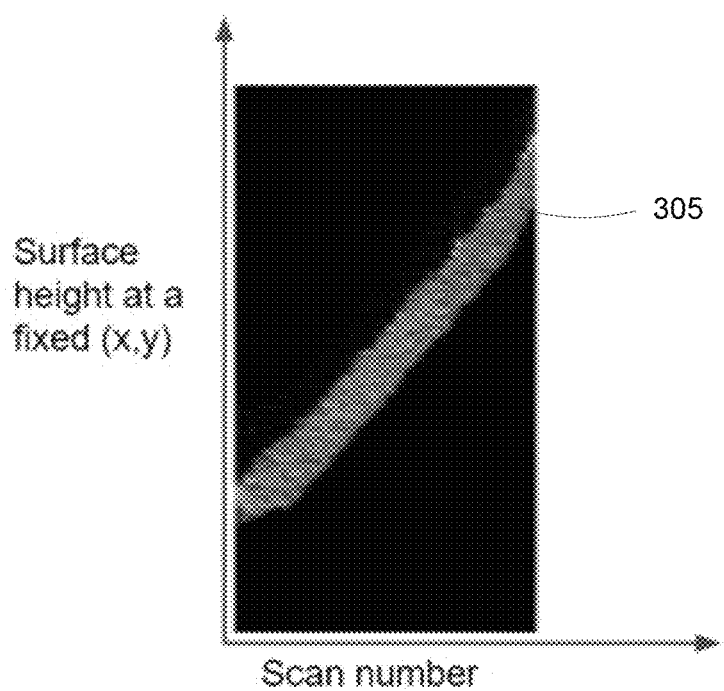
FIG. 4 is a reduced version of the successive scan data of FIG. 3.

One example of the data reduction process leverages that, for fixed coordinates (x, y), the printer 100 might not necessarily deposit material from one scan to the next. If the system does not print a given location in between the scans this means that the scan data should be the same for the two scans. For these instances, the data reduction process might average the scan data or choose a value from one of the scans to reduce the data. Averaging data typically reduces the measurement noise. This data reduction, in general, reduces the overall computation time and reduces storage costs. Referring to FIG. 4, a reduced data set 305 for a particular (x, y) location is shown.

2.3 Average Layer Thickness Computation

Referring again to FIG. 2, the reduced data set 305 is provided as input to a third step 306 that computes an array of average layer thickness 307 for the received data. The average layer thickness can be computed in a variety of ways. It can be done for each coordinate (x, y) independently. It can be done for all coordinates (e.g., for the whole printed object). In multi-material AM systems, it might be useful to compute average layer thickness for each material type (e.g., build material 1, build material 2, support material, etc.). This is especially useful for inkjet-based 3D printing, where the droplet sizes might vary depending on the material type.

In some examples, the average layer thickness is computed by scanning the initial depth, printing n (e.g., n=20) layers of material, scanning the depth again, and computing the average layer thickness based on the differences in depth. This can be done separately for different material types. In some embodiments, this can be done as a pre-process or during the printer calibration process.

In other examples, the average layer thickness is computed by, for each scan, identifying a first peak in a frequency domain representation of an interference signal (in an OCT scanning process). A line is fit to the peaks identified for the scans over time, where the slope of the line is effectively the layer thickness.

2.4 Alignment

Referring again to FIG. 2, the reduced data set 305 and the average layer thickness 307 are provided to a fourth step 308 that shifts the data of the reduced data set 305 based on the average layer thickness 307 to generate an aligned data set 309.

Figure 5:
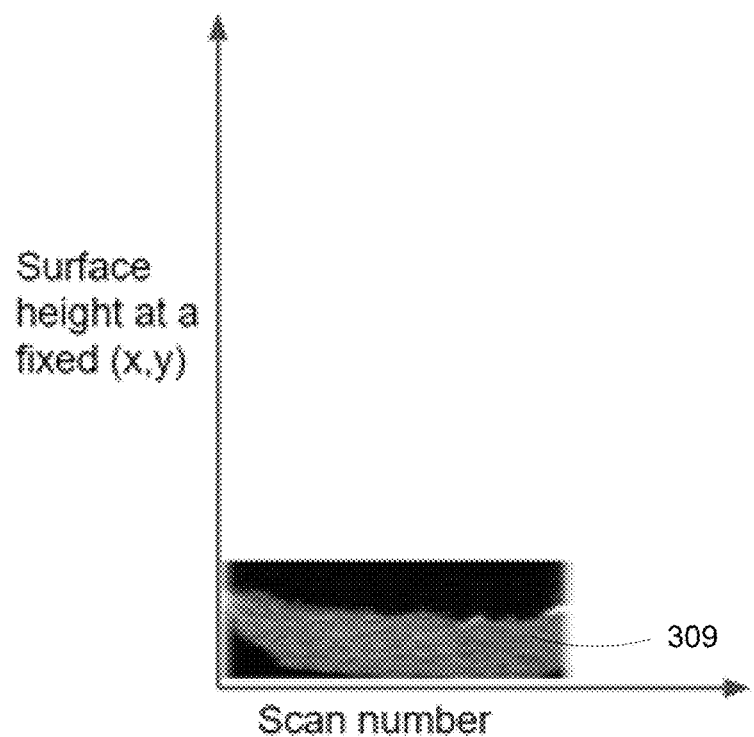
FIG. 5 is a shifted version of the reduced version of the data shown in FIG. 4.

In some examples, the aligned data set 309 is generated by, for each layer in the reduced data set 305, the reduced data set 305 is shifted by the average layer thickness from the layer's scan data or the expected depth (or a combination of the two). The alignment operation essentially removes the slope due to the ever-increasing height of the object being printed from the reduced data set 305. If the printer were to print perfectly, all the data in the aligned data set 309 would be aligned along one horizontal line. For example, making the data flat removes the variable delta (i.e., the amount of printed material) from the problem. At a point (x,y), a variable z is slightly oscillating above and below a level (i.e., the horizontal line). Put another way, shifting the data by the expected depth (after printing each layer) effectively aligns all surfaces (after printing each layer) to be along one horizontal line. Due to the inaccuracies in printing this is typically not the case but there should be a continuous line (e.g., from left to right in the figure)—this is because there is continuity in the surface as it is being printed Referring to FIG. 5, a graph depicting one example of an aligned data set 309 is shown.

2.5 Regularization/Filtering

Referring again to FIG. 2, the aligned data set 309 is provided as input to fifth step 310, which smooths the aligned data 309 to regularize the aligned data 309, generating a smoothed dataset 311. In practice, such a smoothing operation may be performed by a filtering the aligned data set 309 using, for example, a Gaussian filter, a median filter, or mean filter with limited extent (e.g., 3-8).

Figure 6:
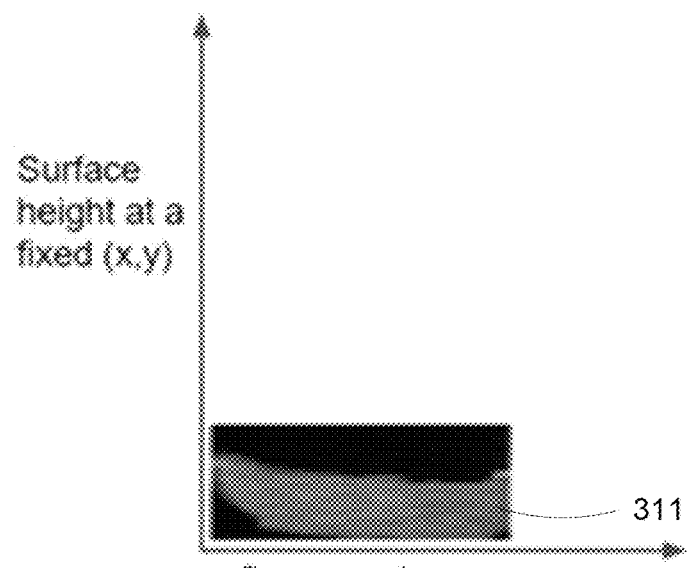
FIG. 6 is a filtered version of the shifted version of the data shown in FIG. 5.

Referring to FIG. 6, one example of a smoothed data set 311 generated by smoothing the aligned dataset 309 of FIG.

5 is shown. The smoothing operation locally smooths the data along the horizontal (scan) direction. In some embodiments, a simple horizontal filter is applied to the array/image when the data is aligned. In other embodiments, the filter needs to follow (e.g., be oriented with) the depth changes when the data is not aligned. This filtering step helps with removing noise and reduces missing data. It also reduces depth values that do not follow expected depth data. Effectively, this step takes advantage of the input model (e.g., print data). If the print data/model is deemed valid, then a larger filter should be used. Additionally, if there is low confidence in the print data, a smaller filter size may be used.

2.6 Energy Array/Image Computation

Referring again to FIG. 2, the smoothed data set 311 is provided as input to a sixth step 312 that processes the smoothed data set 311 to generate an energy array/image 313. As introduced above, the OCT data provides a response as a function of depth, but does not directly yield a surface height, or even a value that represents where the surface may be. To help identify the surface height, the energy array/image 313 is determined. The energy array/image 313 can be represented as a function that has a low value (as represented by a black or dark gray color) where the surface is present and high value where there is no surface. For the $t^{th}$ scan, this function is denoted $EI(t,z)$. In some examples, $EI(t,z)$ is surface data representative of a degree of consistency of a plurality of heights of the surface of the object with said scan data.

There are multiple ways to determine the energy array/image 313. In some embodiments, the energy image is constructed as a function of a gradient in the vertical direction combined with a weighting function, where gradients that are closer to the top of the image are weighted more than the later gradients. That is, a large positive rate of change from low response to high response in the OCT response corresponds to a low value of $EI(t,z)$. In some examples, edge detection algorithms are used to determine the energy array/image 313.

Figure 7:
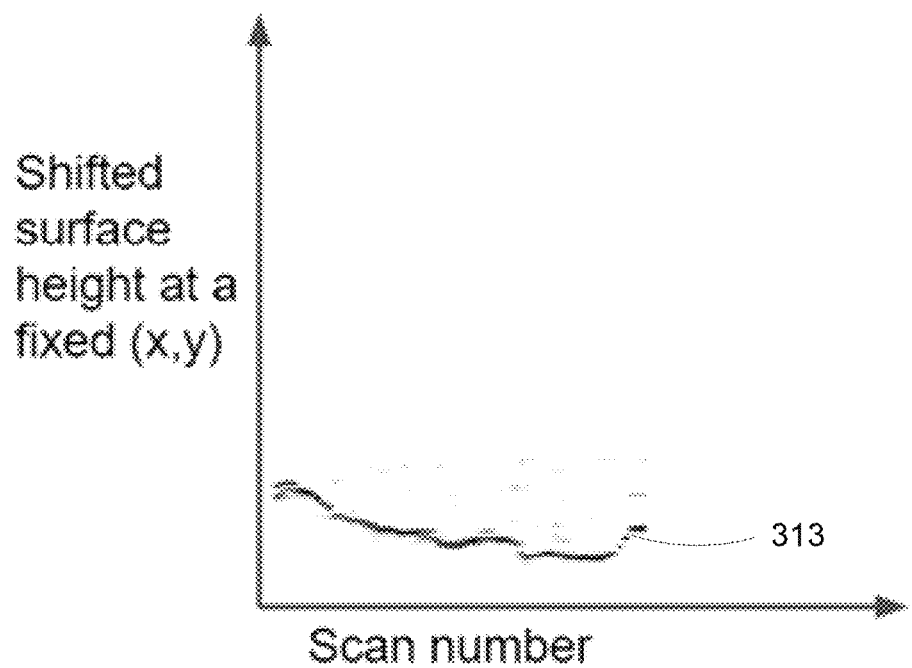
FIG. 7 is an energy image/array determined from the filtered version of the data shown in FIG. 6.

Referring to FIG. 7, one example of an energy array/image 313 generated by processing the smoothed data set 311 of FIG. 6 in the sixth step 312 is shown. In FIG. 7, the areas of the graph data which correspond to the progression of the surface height of the object being printed over time (or scans) is shown as a dark line.

2.7 Solving for the Optimal Depth Estimate

Referring again to FIG. 2, the enemy array/image 313 is provided as input to a seventh step 316 that processes the energy array/image to determine an optimal depth estimate 317 for the (x, y) position.

In some examples, the optimal depth is determined by solving for path from left to right (or right to left) in the scan direction that produces a minimum energy. This path corresponds to the depth values at each instance time instance. The path should be close to continuous (e.g., there should be no big vertical jumps when moving between the neighboring columns) Solving for this path is an optimization problem. In some examples, the global minimum to the optimization problem is found using dynamic programming For example, in a dynamic programming solution, a cumulative energy image $CEI(t,z)$
is computed by working on columns from left to right (or right to left), value of CEI (t, z) is computed as the sum of the value of $EI(t, z)$ plus the minimum of CEI in the previous column in a small neighborhood e.g., $$CEI(t,z)=EI(t,z)+\min[CEI(t-1,z-1),CEI(t-1,z)CEI(t-1,z+1)].$$

Larger neighborhoods can be used.

For the first column $CEI(0,z)=EI(0,z)$. Once the CEI is computed, the optimal path is found by finding the minimum value in the last column and then backtracking how the minimum was computed (e.g., which z in the previous column (t−1) was the minimum when computing $CEI(t,z)$). The optimal path is output as the optimal depth estimate 317.

Figure 8:
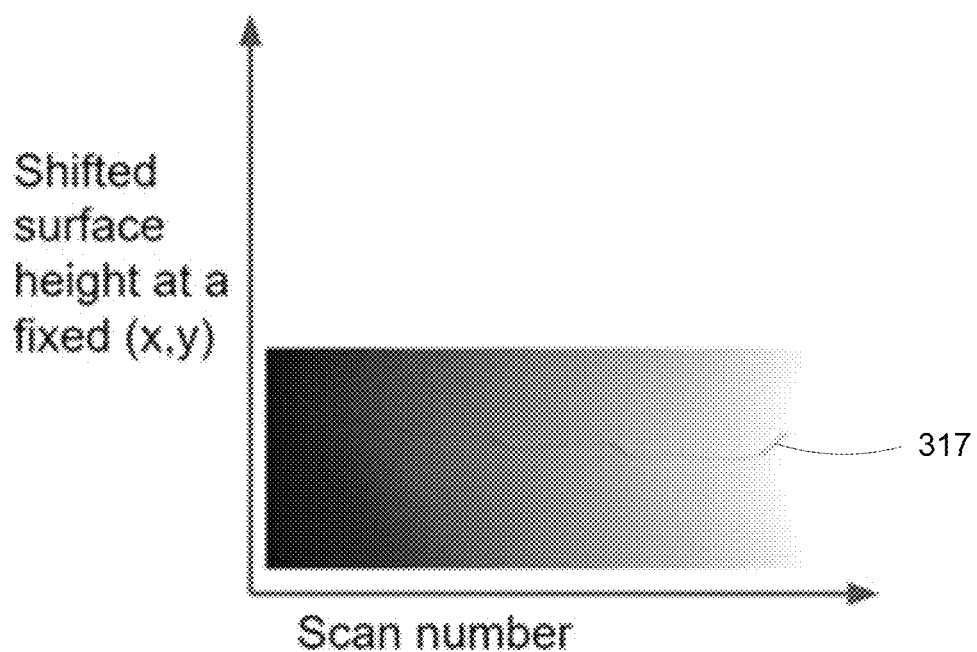
FIG. 8 is an optimal path for the energy image/array shown in FIG. 7.

Referring to FIG. 8, the optimal depth estimate 317 for the energy array/image 313 of FIG. 7 is shown.

2.8 Data Remapping

Referring again to FIG. 2, the optimal depth estimate 317 is provided as input to an eighth step 318 that maps the optimal depth estimate 317 back to the input space by inverting the column shift step (i.e., step 308) and expands the compressed columns (e.g., those compressed in the data reduction process step 304). The output (sometimes referred to as 'estimated depth data') 321 of the eighth step 318 is the optimal depth estimate for the scan at each (x, y) position in the original input space.

Figure 9:
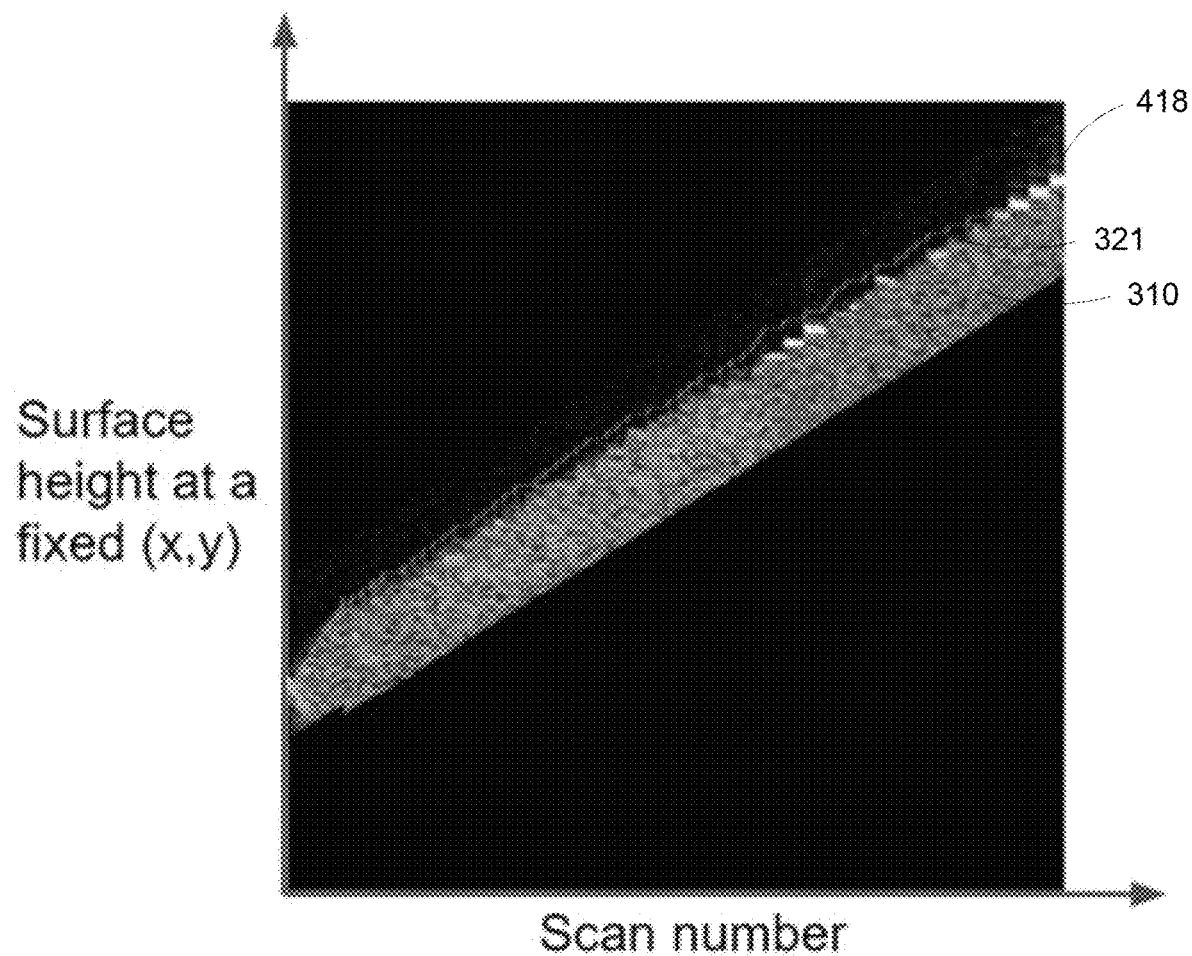
FIG. 9 shows successive scan data, an expected depth sequence, and a reconstructed depth sequence for a particular (x, y) coordinate.

Referring to FIG. 9, the optimal depth estimate mapped into the input space 321 is shown along with the successive scan data 301 and the expected height data 418 for the (x, y) position.

3 Alternatives

It is noted that alternatives to the dynamic programming approach described above can be used to identify the optimal depth estimate. Given a sequence of raw scan data, and a sequence of expected heights, other methods (e.g., regression, Kalman filtering, neural network, curve fitting, and graph cut approaches) can alternatively be used to estimate the optimal depth estimate and may yield similar results.

While the discussion above relates mostly to the use of temporal data to improve a depth reconstruction, it is notes that the techniques above can also use spatio-temporal data (e.g., rather than simply tracking a single (x, y) position over time, the algorithm can additionally track a spatial neighborhood of positions around (and beneath in the z direction) the (x, y) position to improve the depth reconstruction. Furthermore, the model of the printed object can also be used, providing an expectation as to how the print depth should grow over time.

In the discussion above, the data processing procedure effectively uses the expected layer thicknesses, and the energy function, which may be considered to effectively represents a distribution of a surface height estimate, to perform a constrained optimization to track the height as layers are added. Alternative procedures may also be used for this purpose. For example, a straight line or horizontal line regression could be performed rather than the dynamic programming approach described above. As another alternative, a statistical approach may be used in which for each deposited layer, there is an expected achieved thickness and a variance (square of the standard deviation) of that thickness. For example, calibration data may be used to both determine the average and the variance. Similarly, the OCT data may yield an estimate of the height (e.g., based on the rate of change from low to high response), and the variance of that estimate may be assumed or determined from the data itself. Using such statistics, the estimate of the height after the $t^{th}$ layer may be tracked, for example, using a Kalman filter or other related statistical approach. As yet another alternative, a neural network technique may be used to process successive OCT scan using a recurrent neural network approach and output an indicator of the surface location.

It is noted that certain steps of the example described above are optional in the sense that they can be omitted while still allowing for the procedure to determine an optimal depth estimate. For example, steps such as the data reduction step, the average layer computation step, the alignment step, and the filtering/regularization step may be omitted in certain implementations.

In some examples, triangulation-based sensing techniques are used instead of OCT sensing. The algorithm processes the triangulation-based sensing data in much the same way that the OCT data is processed (as described above).

The printing system described above includes multiple jets. But it should be noted that aspects described in this application are also applicable to printing systems having only a single jet.

4 Implementations

The printer shown in FIG. 1 is only an example, and other printer arrangements that may be used are described for example, in U.S. Pat. No. 10,252,466, "Systems and methods of machine vision assisted additive fabrication," U.S. Pat. No. 10,456,984, "Adaptive material deposition for additive manufacturing," U.S. Pat. Pub. 2018/0056582, "System, Devices, and Methods for Injet-Based Three-Dimensional Printing," as well as in Sitthi-Amorn et al. "MultiFab: a machine vision assisted platform for multi-material 3D printing." *ACM Transactions on Graphics (TOG)* 34, no. 4 (2015): 129. The above-described estimation of depth data may be integrated into the feedback control process described in co-pending U.S. Pat. Pub. 2016/0023403 and 2018/0169953. All of the aforementioned documents are incorporated herein by reference An additive manufacturing system typically has the following components: a controller assembly is typically a computer with processor, memory, storage, network, IO, and display. It runs a processing program. The processing program can also read and write data. The controller assembly effectively controls the manufacturing hardware. It also has access to sensors (e.g., 3D scanners, cameras, IMUs, accelerometers, etc.).

More generally, the approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (fix receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for determining estimated depth data for an object during additive fabrication, the method comprising:
    scanning the object producing scan data corresponding to a region of the object, including successively scanning the object to produce successive scan data, with intervening additive fabrication of a material layer on the region of the object occurring between at least some successive scannings of the object;
    determining estimated depth data representing a surface of the object after the successive scanning by combining the successive scan data; and
    using the estimated depth data in a feedback loop to control additive fabrication of a material layer on the surface of the object represented by the estimated depth data.

2. The method of claim 1, wherein the determining estimated depth data is based in part on a combination of a 3D fabrication plan and the successive scan data, the combination including:
    receiving as input the 3D fabrication plan;
    modifying the 3D fabrication plan based in part on the successive scan data;
    creating a cumulative data set based in part on the successive scan data;
    modifying the cumulative data set, the modifying comprising:
        computing an average value of a subset of the successive scan data, wherein the subset of successive scan data corresponds to consecutive scans;

reducing the size of the cumulative data set based in part on the average value of a subset of the successive scan data;

discretizing the cumulative data set into a set of discrete columns, wherein each column in the set of discrete columns represents a range of surface heights on the surface of the object;

applying a correction factor to each column in the set of discrete columns, wherein, for each column, the correction factor is based in part on the range of surface heights associated with the column;

applying a horizontal filter to the set of discrete columns to create a filtered scan data sequence; and computing a correction path based on the cumulative energy image, wherein the correction path is indicative of a difference between the 3D fabrication plan and the object.

3. The method of claim 1 wherein combining the successive scan data comprising determining estimated successive depth data from respective scan data, and applying at least one of a regression and a probability based procedure to estimated successive depth data to yield the estimated depth data after the scanning.

4. The method of claim 1 wherein determining estimated depth data representing the surface of the object after the successive scanning by combining the successive scan data further uses a prior model of the object.

5. The method of claim 1 wherein scanning the object producing scan data includes spatially smoothing scan data across the region of the object.

6. The method of claim 1, wherein using the estimated depth data further includes using a model of the object being fabricated to plan characteristics of the material layer to be deposited on the surface of the object.

7. The method of claim 1, wherein prior to each of at least some intervening additive fabrication of a material layer on a region of the object occurring between at least some successive scannings of the object, control of the additive fabrication of said material layer uses a combination the scan data from multiple scans obtained prior to said intervening additive fabrication.

8. A method for determining estimated depth data for an object during additive fabrication, the method comprising:

scanning the object producing scan data corresponding to a region of the object, including successively scanning the object to produce successive scan data, with intervening additive fabrication of a material layer on the region of the object occurring between at least some successive scannings of the object; and determining estimated depth data representing a surface of the object after the successive scanning by combining the successive scan data, wherein combining the successive scan data comprises:

for each scan of the successive scan data processing said scan to form surface data representative of a degree of consistency of a plurality of heights of the surface of the object with said scan data; and combining the successive surface data corresponding to the successive surface scan, including performing a constraint optimization to determine successive surface heights that are consistent with the successive surface data and consistent with expected thickness of material layers deposited between the successive scans.

9. The method of claim 8, wherein the surface data comprises an energy function of height of the object, and wherein performing the constrained optimization comprises applying a dynamic programming procedure to determine the successive surface heights to optimize a cumulative energy subject to constraints relative to the expected thicknesses.

10. The method of claim 9, wherein the energy function of height of the object comprises a function of height relative to an expected thickness of deposited material.

11. The method of claim 8 wherein the horizontal filter is a Gaussian filter, a Median filter, or a Mean filter.

12. The method of claim 11 further comprising:

determining expect depth change data associated with the intervening additive fabrication; and wherein determining estimated depth data after the successive scanning includes combining the successive scan data and the expected depth change data.

13. The method of claim 12 wherein determining the expect depth change data comprises determining an average material layer thickness associated with each intervening additive fabrication.

14. The method of claim 11 further comprising:

determining a statistical representation of depth change associated with the intervening additive fabrication; and wherein determining estimated depth data after the successive scanning includes combining the successive scan data and the statistical representation of depth change to yield a depth estimate.

15. A method for feedback based additive fabrication of an object, comprising performing a plurality of iterations of additive fabrications, at least some of the iterations each comprising:

scanning the object, formed by depositing of multiple material layers, producing scan data corresponding to a region of the object;

determining estimated data representing the region of the object by combining the successive scan data obtained in scanning in the iteration and scan data obtained in one or more prior iterations;

planning characteristics of a material layer to be deposited on the region of the object based on the estimated data; and causing the material layer to be deposited according to the planned characteristics of the material layer.

16. The method of claim 15, wherein scanning the scan data represents a distribution of a surface height estimate, and the estimated data represents an estimate of the surface height.

17. A non-transitory machine-readable medium comprising instructions stored thereon, execution of the instructions causing a data processing system to:

obtain scan data produced by scanning the object corresponding to a region of the object, including produced by successively scanning the object to produce successive scan data, with intervening additive fabrication of a material layer on the region of the object occurring between at least some successive scannings of the object;

determine estimated depth data representing a surface of the object after the successive scanning by combining the successive scan data; and use the estimated depth data in a feedback loop to control additive fabrication of a material layer on the surface of the object represented by the estimated depth data.

* * * * *